Jan. 26, 1926.

G. D. SUNDSTRAND

LATHE

Filed July 7, 1923   2 Sheets-Sheet 1

1,570,648

FIG. 1ª

Inventor
G. D. Sundstrand
By Chindahl, Parker & Carlson
Attys

Jan. 26, 1926. 1,570,648
G. D. SUNDSTRAND
LATHE
Filed July 7, 1923 2 Sheets-Sheet 2
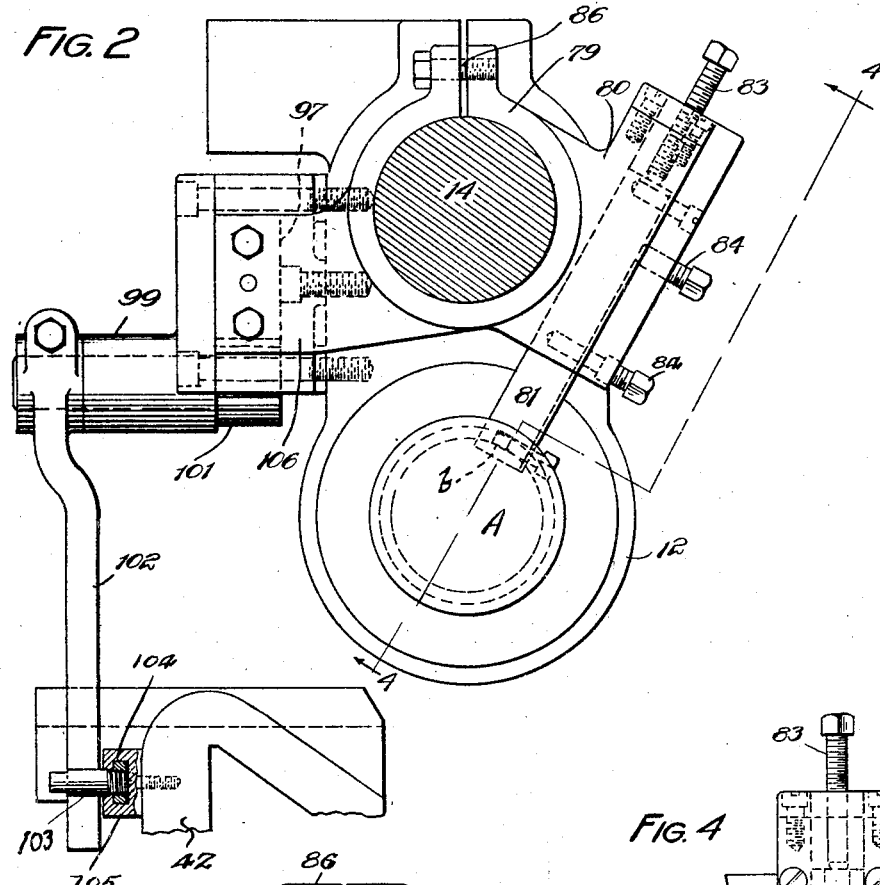
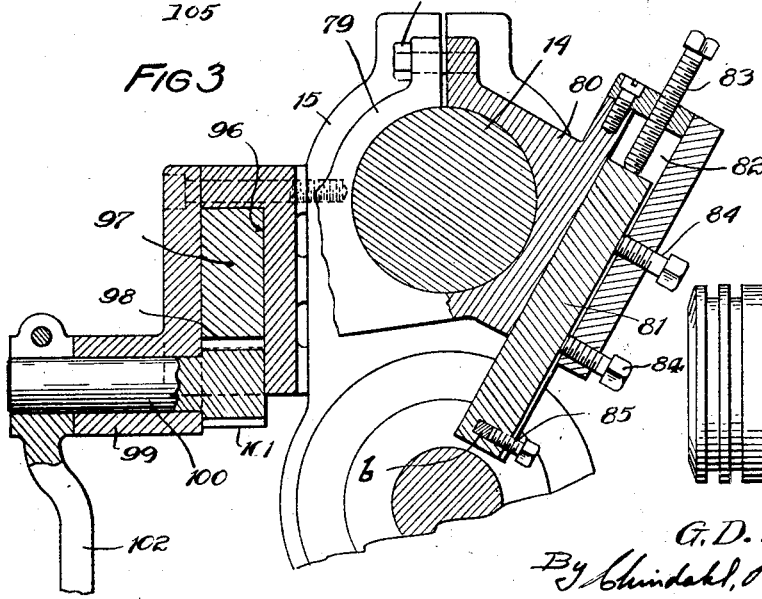
Inventor
G. D. Sundstrand Patented Jan. 26, 1926.

1,570,648

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

LATHE.

Application filed July 7, 1923. Serial No. 650,171.

*To all whom it may concern:*

Be it known that I, GUSTAF DAVID SUNDSTRAND, a citizen of the United States, residing at Rockford, in the county of Winnebago and State of Illinois, have invented a certain new and useful Lathe, of which the following is a specification.

The invention pertains to a lathe which is particularly adapted for use in the manufacture of parts requiring a substantial amount of machine work, such, for example, as pistons, pulleys, bushings and rings of various types, and similar small parts upon which a number of special operations must be performed.

The object of the invention, generally stated, is to provide in a lathe of the character indicated, and in combination with a main tool carriage, an auxiliary tool carrier operatively associated with the carriage so as to be actuated in the movements of the latter whereby to feed a cutting tool into engagement with the work.

A more specific object of the invention is to produce a lathe in which a tool carrier is slidably supported above and independently of the lathe bed, and which is arranged to be operated by power-actuated mechanism whereby to effect the feeding of a tool into operative engagement with the work.

Still another object of the invention is to provide a lathe having an overarm and means of a simplified construction for feeding a tool carried by the overarm into engagement with the work.

The objects of the invention thus generally stated, together with other and ancillary advantages, may be attained by the construction and arrangement illustrated in the accompanying drawings forming part hereof, but it is contemplated that other and equivalent means may be devised by those skilled in the art without departing from the spirit and scope of the invention as expressed in the appended claims.

Figure 1:
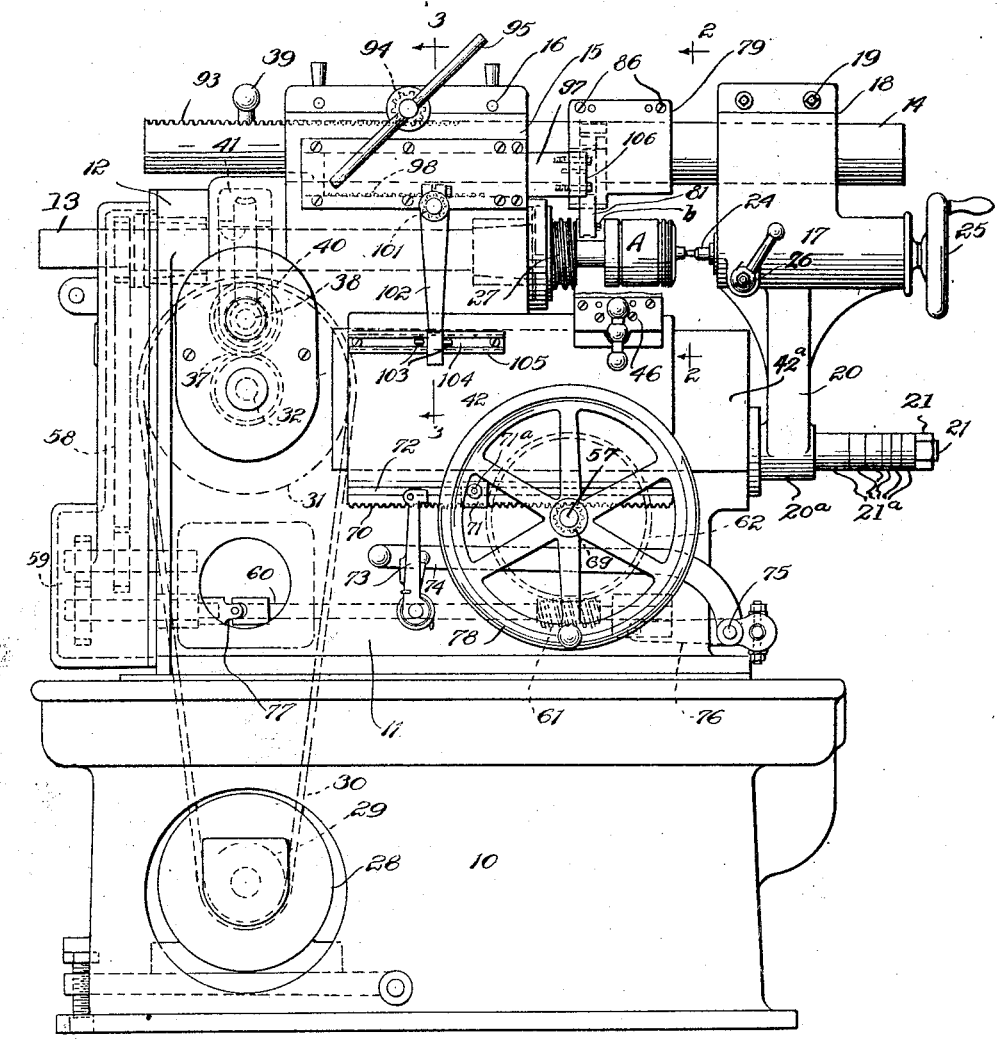
Figure 1:
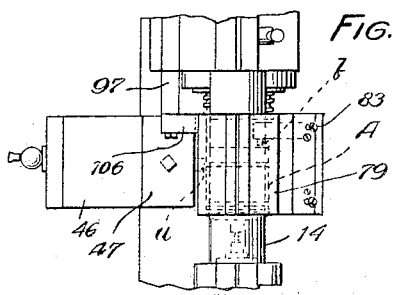

Figure 1 of the drawings is a front elevational view of a lathe embodying my invention. Fig. 1ª is a fragmentary plan view showing the front tool carriage and the auxiliary tool carrier. Fig 2 is a fragmentary vertical sectional view taken substantially in the plane of line 2—2 of Fig. 1. Fig. 3 is a similar view but taken in the plane of line 3—3 of Fig. 1. Fig. 4 is a fragmentary rear elevation partly in section, taken approximately in the plane of line 4—4 of Fig. 2.

I have herein shown and will describe my invention as it is applied to the machining of internal combustion engine pistons, the auxiliary tool carrier being utilized to support a tool for longitudinal feeding movement into engagement with the open end of the piston for the purpose of turning the inner periphery or skirt thereof.

As herein shown, the lathe comprises a hollow base 10 upon which is supported a body 11 of substantial height at one end forming in effect a column and lower at its other end to form a bed. The upper portion of the column forms a stationary headstock 12 in which a work-supporting spindle 13 is journalled, and above the spindle is mounted a shaft 14 which extends longitudinally over the bed. This shaft is made of substantial size, forming a rigid overarm, and is securely clamped in the extreme upper end of the column by means of a split bearing 15 formed integral with the headstock and having clamping bolts 16.

At the opposite end of the bed I provide a tailstock 17 which is so mounted as to constitute a connection between the overarm and the lathe bed. Thus the tailstock has in its upper portion a split bearing 18 equipped with clamping bolts 19 whereby the tailstock may be rigidly clamped upon the overarm. Also the tailstock has a depending portion 20 the hub 20ª of which is adjustably mounted upon a stud 21 projecting outwardly from the bed. The stud 21 is of sufficient length to allow for any necessary adjustment of the tailstock. 21ª are spacer sleeves or collars which may be placed on the stud 21 at either or both sides of the hub 20ª. 21ᵇ is a nut on the outer end of the stud 21 for clamping said hub and the series of spacer sleeves against the end of the bed. This construction while providing an effectual support for the tailstock also provides a support for the free end of the overarm. The tailstock may be provided with a center 24 adjustable in the usual way by means of a hand wheel 25 and arranged to be locked by the clamping screw 26.

The spindle 13 may be provided with suitable means for holding the work A, herein shown as a piston. I have shown in the present instance for this purpose a chuck 27 of a well known character.

Enclosed within the base 10 is an electric motor 28 which I prefer to employ as the source of power. This motor is connected with the spindle 13 by means of a pulley 29, a belt 30, a pulley wheel 31 mounted upon a shaft 32, and a pair of intermeshing gears 37. One of these gears is fastened upon the shaft 32 and the other is mounted upon a parallel shaft 38 which also carries a worm 40 meshing with a worm wheel 41 fast upon the spindle 13. A suitable shifting clutch (not herein shown) having an operating handle 39 (Fig. 1) may be interposed between the pulley wheel 31 and its driving connection with the spindle.

Movable longitudinally of the lathe bed, in a direction parallel to the spindle, is a front carriage 42 mounted upon suitable ways 42ª and having a saddle 46 mounted thereon for transverse movement. The saddle in turn may support a tool holder 47 adapted to carry one or more turning tools a which in the longitudinal movement of the carriage serve to turn the outer periphery of the work A.

The mechanism for moving the carriage 42 is actuated from a shaft 57 mounted transversely in the bed and operatively connected with the spindle 13 by means of a chain and sprocket connection 58, change speed gears 59, a shaft 60, a worm 61 and a worm wheel 62, the latter being fast upon the forward end of the shaft 57. Also fast on said shaft 57 is a pinion 69 adapted to engage with a rack 70 rigid with the lower edge of the carriage. A block 71 is mounted for longitudinal adjustment at the lower edge of the carriage in a groove 72 and has a forwardly projecting pin 71ª arranged to engage with a means for stopping the feeding operation at a predetermined point in the travel of the carriage. This means comprises a latch member 73 normally supporting the free end of a lever 74 pivoted at 75 and having rigid therewith an arm 76 which supports the free end of the shaft 60 upon which the worm 61 is mounted. In said shaft is interposed a universal coupling 77 which, when the latch member 73 is engaged by the pin 71ª to release the lever 74, permits the worm 61 to disengage from the worm wheel 62. It will be apparent that upon the operation of this trip mechanism the carriage is brought to a stop to restore the parts to their initial position the shaft 57 may be rotated through the medium of a hand wheel 78.

The auxiliary tool carrier is slidably mounted upon the overarm 14, which thus constitutes a slideway whereby the carrier is supported above and independently of the bed so as to permit of the utilization of the latter for supporting the front tool carriage 42 and the rear tool carriage (not herein shown).

The tool carrier in the present instance comprises a split head 79 having formed upon its rear side a tool block 80 in which is mounted for up and down adjustment a tool holder 81. To receive said holder 81 the block 80 is constructed to provide a housing forming an enclosed slideway in the form of a downwardly opening socket 82. In the upper end wall of this housing is mounted and adjusting screw 83, and in the side wall is a pair of clamping screws 84 adapted to engage with the side of the tool holder to secure it in any desired position of adjustment. The lower end of the holder may be suitably constructed to carry a tool b, being herein apertured in a direction extending parallel to the axis of the work and provided with a set screw 85 adapted to engage with the tool. It will be apparent that the arrangement is such that the tool may be rigidly supported between the overarm and the bed in spaced relation to the latter and in any desired position of radial adjustment with respect to the work.

As shown in Fig. 1 of the drawings, I preferably provide a means for moving the overarm bodily in the headstock 15, comprising rack teeth 93 formed upon the upper side of the overarm and arranged to mesh with a pinion 94 mounted in the headstock transversely thereof and operable by means of a cross bar 95; and it will be apparent that if desired the auxiliary tool carrier might readily be operated manually by this mechanism into engagement with the work, it being only necessary to clamp the head 79 thereon by means of its clamping bolts 86. Preferably, however, I provide an operative association between the auxiliary tool carrier and the front tool carriage whereby the former is actuated automatically in the feeding movement of the latter. This operative association between the auxiliary tool carrier and the front tool carriage comprises in the present instance a lever-operated gearing connection which will now be described.

Upon the forward side of the headstock 15 I provide a housing forming an enclosed slideway 96 (Fig. 3) for a longitudinally movable bar 97 having at its lower edge rack teeth 98. Near its lower central portion, the front plate of the housing forming the slideway is constructed to provide a bearing 99 for a shaft 100 carrying at its inner end a pinion 101 which meshes with the rack 98. Upon the outer end of said shaft is fast the upper end of a lever 102, the lower end of which operatively engages with the carriage 42 through the medium of a pair of pins 103. Said pins are adjustably mounted in a undercut or T-slot 104 provided in a bar 105 fast upon the front side of the carriage 42.

The slide bar 97 extends longitudinally beyond the slideway 96 (Figs. 1 and 1ª) and has bolted to its extreme end a transversely extending bracket 106 the rear end of which is rigid with the head 79.

The arrangement is such that as the carriage 42 is moved in one direction (to the left, Fig. 1) whereby to move the cutting tool a longitudinally of the work to turn its outer periphery, the tool b of the auxiliary tool carrier is moved in the opposite direction (to the right) into engagement with the open end or skirt of the work A. Thus both cutting tools are moved into engagement with the work simultaneously or substantially so, by a single feed mechanism.

It will be observed that the provision of the auxiliary tool carrier is rendered possible by the presence of the overarm which constitutes a rigid support for this carrier, independent of the lathe bed, leaving the latter free for use in supporting the front and rear tool carriages. A distinct advantage is gained in the actuating means provided for the auxiliary tool carrier, by reason of the fact that it is controlled by mechanism which controls the front tool carriage. Moreover, the construction is greatly simplified.

The general construction of the lathe herein illustrated is claimed in my application Serial No. 591,038, filed September 27, 1922.

I claim as my invention:

1. A lathe having an overarm, a tool carrier supported by the overarm, a reciprocatory member, means providing an enclosed slideway for said member, means for actuating said member including a shaft having a gearing connection with the member, and means connecting the member with the tool carrier.

2. A lathe having a headstock, an overarm mounted in the headstock, a tool carrier on the overarm, a reciprocatory member connected with the carrier, means on the headstock providing an enclosed slideway for said member, a shaft journalled in the last mentioned means and having a rack and pinion connection with said member, and means for rotating said shaft.

3. A lathe having a front tool carriage, an overarm having an auxiliary tool carrier thereon, and means for sliding said carrier on the overarm including a lever having an adjustable connection with said carriage.

4. A lathe having a tool carriage, an overarm having a tool carrier, means for moving said carriage including a trip mechanism adapted to interrupt the carriage movement at a predetermined point in its travel, and means operatively connecting said carrier with said carriage for movement thereby.

5. A lathe having a tool carriage, means for imparting a predetermined movement to said carriage, an overarm, a tool carrier on said overarm, and means operatively connecting said tool carrier with said carriage.

6. A lathe having, in combination, a bed, a headstock, a bearing formed on said headstock, an overarm mounted in said bearing, a stud projecting from the bed parallel with said overarm, a tailstock mounted on said stud and said overarm, spindles mounted in said stocks for rotatably supporting the work, a front carriage mounted on the bed to travel parallel with said spindles and overarm, a tool on said front carriage for turning the periphery of the work, an auxiliary tool carrier slidably mounted upon the overarm between said bearing and said tailstock, a tool on said auxiliary tool carrier for turning an interior portion of the work, a rack connected to the auxiliary tool carrier and slidably supported upon said bearing, a pinion supported on said bearing and meshing with said rack, an arm rigid with said pinion, and pins adjustably mounted upon the front tool carriage for swinging said arm in the travel of the front tool carriage.

7. A lathe having, in combination, a bed, a headstock on the bed, an overarm supported above the bed, a stud projecting from the bed parallel with said overarm, a tailstock mounted on said stud and said overarm, spindles mounted in said stocks for rotatably supporting the work, a front carriage mounted on the bed to travel parallel with said spindles and overarm, a tool on said front carriage for turning the periphery of the work, an auxiliary tool carrier slidably mounted upon the overarm, a tool on said auxiliary tool carrier for turning an interior portion of the work, a rack connected to the auxiliary tool carrier, a pinion meshing with said rack, and an arm rigid with said pinion and arranged to be swung by the front tool carriage in the travel of the latter.

8. A lathe having, in combination, a bed, a headstock on the bed, a bearing formed on the upper portion of said headstock, an overarm mounted in said bearing, a spindle mounted in said headstock for rotatably supporting the work, a front carriage mounted on the bed to travel parallel with said spindle and overarm, a tool on said front carriage for turning the periphery of the work, an auxiliary tool carrier mounted upon the overarm, a tool on said auxiliary tool carrier for turning an interior portion of the work, and means for moving said auxiliary tool carrier parallel with the front carriage.

9. A lathe having, in combination, a bed, an overarm supported above the bed, a front carriage mounted on the bed to travel parallel with said overarm, a tool on said front carriage for turning the periphery of the work, an auxiliary tool carrier mounted upon the overarm, a tool on said auxiliary tool carrier for turning a relatively short interior portion of the work, a rack connected to the auxiliary tool carrier, a pinion meshing with said rack, an arm rigid with said pinion, and pins adjustably mounted upon the front tool carriage for swinging said arm to impart a relatively small amount of movement to the auxiliary tool carrier in the travel of the front tool carriage.

In testimony whereof, I have hereunto affixed my signature.

GUSTAF DAVID SUNDSTRAND.